US012566751B2

(12) United States Patent
Roscoe

(10) Patent No.: US 12,566,751 B2
(45) Date of Patent: Mar. 3, 2026

(54) DISTRIBUTED TRANSACTIONAL DATABASE CONSENSUS

(71) Applicant: British Telecommunications Public Limited Company, London (GB)

(72) Inventor: Jonathan Roscoe, London (GB)

(73) Assignee: British Telecommunications Public Limited Company, London (GB)

( * ) Notice: Subject to any disclaimer, the term of this patent is extended or adjusted under 35 U.S.C. 154(b) by 121 days.

(21) Appl. No.: 17/758,376

(22) PCT Filed: Dec. 18, 2020

(86) PCT No.: PCT/EP2020/087119
§ 371 (c)(1),
(2) Date: Jul. 5, 2022

(87) PCT Pub. No.: WO2021/140008
PCT Pub. Date: Jul. 15, 2021

(65) Prior Publication Data
US 2023/0025368 A1     Jan. 26, 2023

(30) Foreign Application Priority Data
Jan. 6, 2020     (GB) ..................................... 2000129

(51) Int. Cl.
*G06F 16/23*          (2019.01)
*H04L 9/40*          (2022.01)
(52) U.S. Cl.
CPC ...... *G06F 16/2379* (2019.01); *H04L 63/1441* (2013.01)

(58) Field of Classification Search
CPC ........ G06F 16/2379; G06F 21/64; G06F 8/65; G06F 8/71; H04L 63/123; H04L 63/1441; H04L 63/145; H04L 67/104; H04L 9/3239
See application file for complete search history.

(56) References Cited

U.S. PATENT DOCUMENTS

| | | | |
|---|---|---|---|
| 5,963,447 A | 10/1999 | Kohn et al. | |
| 7,444,309 B2 | 10/2008 | Branke et al. | |
| 8,997,220 B2 | 3/2015 | Yu et al. | |
| 10,291,640 B2 | 5/2019 | Kupreev et al. | |

(Continued)

FOREIGN PATENT DOCUMENTS

| | | |
|---|---|---|
| CN | 110493345 A | 11/2019 |
| WO | WO-02056596 A2 | 7/2002 |

OTHER PUBLICATIONS

Antonopoulos A.M., "Mastering Bitcoin, Unlocking Digital Crypto-Currencies," O'Reilly Media, Apr. 2014, 282 pages.

(Continued)

*Primary Examiner* — Taelor Kim
(74) *Attorney, Agent, or Firm* — EIP US LLP

(57) ABSTRACT
A method of consensus for a distributed transactional database having a logical chain of blocks of stored data is disclosed. Each, block can identify a relationship to a preceding block such that a most recently added block is a current state of the database, and the database stores data relating to a system in execution having associated a measurable characteristic capable of improvement. Each, block of the database can store a specification of a modification to the system and a measure of the characteristic of the system that corresponds to the modification of the system.

5 Claims, 1 Drawing Sheet

(56) References Cited

U.S. PATENT DOCUMENTS

| | | | |
|---|---|---|---|
| 2007/0162405 | A1 | 7/2007 | Parunak et al. |
| 2017/0346637 | A1* | 11/2017 | Zhang |
| 2018/0176229 | A1* | 6/2018 | Bathen .................. H04L 9/3239 |
| 2018/0268382 | A1* | 9/2018 | Wasserman .......... G06Q 20/065 |
| 2018/0337882 | A1 | 11/2018 | Li et al. |
| 2019/0250929 | A1 | 8/2019 | Pasirstein |
| 2019/0287027 | A1 | 9/2019 | Franceschini et al. |
| 2019/0363938 | A1* | 11/2019 | Liebinger Portela ........................ H04L 41/0813 |
| 2019/0372834 | A1 | 12/2019 | Patil et al. |
| 2019/0384587 | A1 | 12/2019 | Rao et al. |

OTHER PUBLICATIONS

Combined Search and Examination Report under Sections 17 and 18(3) for Great Britain Application No. 2000129.3, mailed Jun. 22, 2020, 8 pages.

Cortyl A., "Ethereum & Uncles: How Family Makes You Stronger," Oct. 22, 2017, Retrieved from the Internet: https://medium.com/ibbc-io/ethereum-uncles-how-family-makes-you-stronger-d6e7aaef7b2b, 7 pages.

Creatonics., "What is a Bitcoin Hash?," Coinsutra, Sep. 6, 2019, available from https://coinsutra.com/bitcoin-hash/, 8 pages.

Dillion C., et al., "OpenFlow (D )DoS Mitigation," Feb. 9, 2014, Available from: https://www.os3.nl/_media/2013-2014/courses/rp1/p42_report.pdf, 17 pages.

Dillion C., et al., "OpenFlow DDOS Mitigation," Feb. 9, 2014, Available from: https://www.os3.nl/_media/2013-2014/courses/rp1/p42_presentation.pdf, 18 pages.

International Search Report and Written Opinion for Application No. PCT/EP2020/087119 mailed on Mar. 12, 2021, 11 pages.

* cited by examiner

DISTRIBUTED TRANSACTIONAL DATABASE CONSENSUS

PRIORITY CLAIM

The present application is a National Stage entry of PCT Application No. PCT/EP2020/087119, filed Dec. 18, 2020, which claims priority from GB Patent Application No. 2000129.3, filed Jan. 6, 2020, each of which is hereby fully incorporated herein by reference.

TECHNICAL FIELD

The present disclosure relates to a mechanism for providing consensus in distributed transactional databases.

BACKGROUND

Distributed transactional databases such as blockchain databases are increasingly prevalent and depend on a consensus mechanism through which a set of potentially unrelated, untrusted and untrusting components agree on a state of the database using a predetermined consensus mechanism. Existing consensus mechanisms involve a proof-of-work being demonstrated by components such as by the solution of a challenge, or a proof-of-authority. Proof-of-work involves solving a prescribed problem such as a mathematical or cryptographic problem, or searching for a solution to a challenge, in a manner that is readily reproducible in order by other components operating with such a database. The problem must be solvable and often the problem and its solution relate only to the operation of the database with no other utility.

It would be beneficial to provide an improved consensus mechanism with improved utility.

SUMMARY

According to a first aspect of the present disclosure, there is provided a computer implemented method of consensus for a distributed transactional database, the database comprising a logical chain of blocks of stored data, each block identifying a relationship to a preceding block by a hash of at least each of: data stored in the block; and the preceding block, such that a most recently added block is a current state of the database, and the database storing data relating to a system in execution including one or more computers, the system having associated a measurable characteristic capable of improvement, wherein a specification of a modification to the system and a corresponding measure of the characteristic of the system is stored in each block of the database such that the measure of the characteristic improves in each successive block, the method comprising: receiving a specification of a new modification to the system; measuring the characteristic for the system modified in accordance with the new modification; responsive to a determination that the new modification provides an improvement to the measure of the characteristic of the system in comparison with a measure stored in a most recent block, committing a new block to the database, the new block including the new modification.

In some embodiments, the determination that the new modification provides an improvement is made based on a simulation of the system to which the new modification is applied.

In some embodiments, modifications to the system are specified using a common grammar available to miner components operating with the database.

In some embodiments, the system in execution is at least a portion of a network of computer systems, and the characteristic is a network performance characteristic.

In some embodiments, the network performance characteristic is suitable for identifying a malicious attack of one or more computer systems in the network.

In some embodiments, an improvement of the characteristic is indicative of a mitigation, resolution or cessation of the malicious attack.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
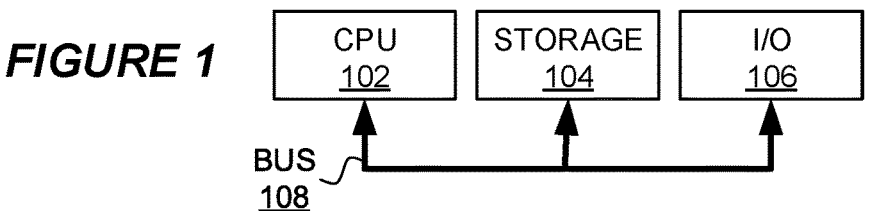
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
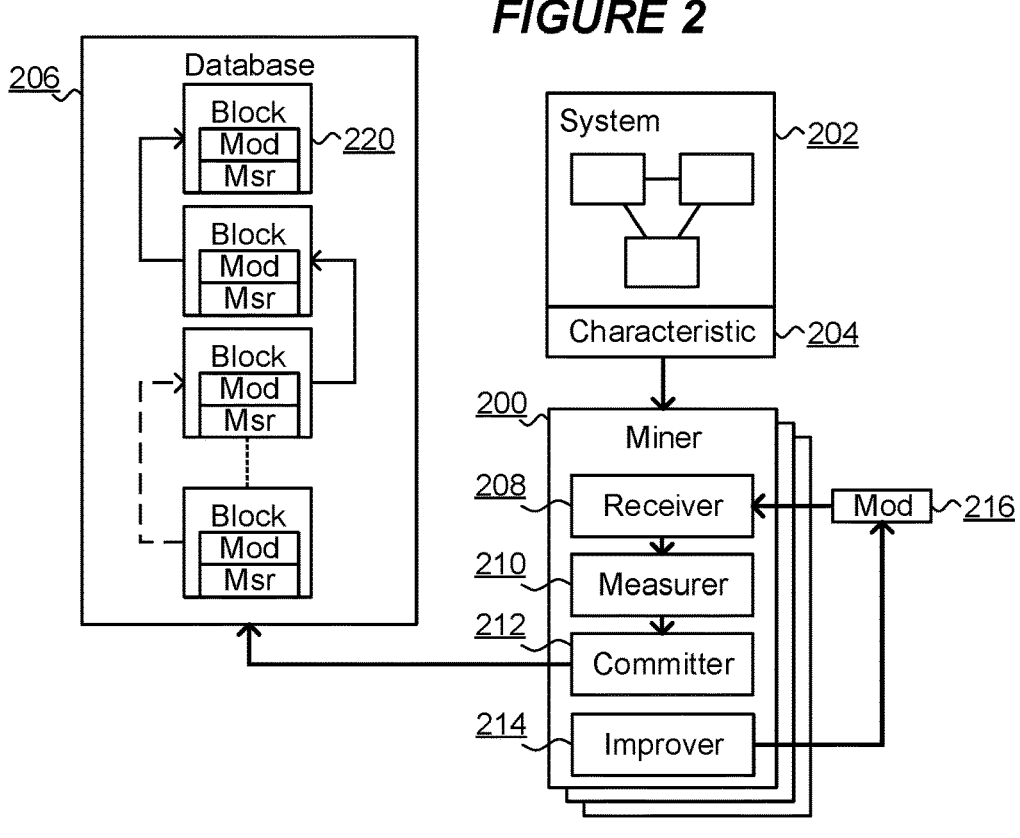
FIG. 2 is a component diagram of an arrangement for providing consensus for a distributed transactional database in accordance with an embodiment of the present disclosure.

FIG. 2 is a component diagram of an arrangement for providing consensus for a distributed transactional database in accordance with an embodiment of the present disclosure. Distributed transactional databases, sometimes known as distributed sequential transactional databases, are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database can be referred to as a blockchain though it will be appreciated that other suitable databases, data structures or mechanisms possessing the characteristics required for embodiments of the present disclosure could alternatively be used. A distributed transactional database 206 is a distributed chain of block data structures 220 accessed by a network of nodes, referred to here as a miner network of miner components 200. Each block 220 in the database 206 can include stored data such as a plurality of transaction data structures, each transaction referring or relating to a prior transaction. For example, in one embodiment, each block 220 includes a Merkle of hash or digest values for transactions included in the block to arrive at a hash value for the block, which is itself combined with a hash value for a preceding block to generate a chain of blocks (blockchain). A new block of transactions is added to the database by miner 200 software, hardware, firmware or combination systems in the miner network. The miners 200 can be communicatively connected to sources of transactions and access or copy the database 206. A miner 200 can undertake validation of a substantive content of a transaction and adds a block of new transactions to the database when a condition is satisfied. Thus, miners 200 in the miner network may each generate prospective new blocks for addition to the database 206. Where a miner 826 satisfies the condition for addition of a new block, such new block is added to the database 206. Accordingly, the database 206 provides a distributed data storage mechanism with verifiable condition satisfaction for proof of the validity of blocks in the database 206.

In accordance with embodiments of the present disclosure, the condition to be satisfied for a new block to be added to the database 206 relates to a characteristic 204 of a system 202. The system 202 is an arrangement, configuration or other provision of one or more computer systems. For example, the system 202 can be a group of physical and/or virtual computer systems communicatively connected by a communications network. Alternatively, the system 202 can be one or more software components executing in one or more computer systems to provide application, business, procedural, scientific, research or other facilities. It will be appreciated by those skilled in the art that the exact nature, arrangement, configuration, purpose and constituents of the system 202 is not important. The system 202 has associated a measurable characteristic 204 that is capable of improvement. That is to say that the characteristic 204 can be measured for the system 202, applies to the whole system 202, and can be improved in some way for the system 202. For example, the characteristic can be a performance measure for the system 202 such as a throughput, efficiency, productivity, capability or other performance metric of the system 202. Additionally or alternatively, the characteristic can be a measure of use, consumption or availability of one or more resources in or for the system 202, such as processor usage, memory usage, network usage and the like. Additionally or alternatively, the characteristic can be a measure of accuracy, efficacy, correctness or fitness of the system 202, such as a measure of how accurately the system 202 performs one or more functions, calculations, estimates, predictions, simulations or the like.

The system 202 is capable of modification by a modification component (not shown) that can include one or more hardware, software, firmware or combination components provided as part of, in association with, external to or in communication with the system 202 in order to effect a modification of the system 202 such as by, inter alia, any or all of: a modification to a configuration of all or part of the system 202; a modification by substitution of all or part of the system 202; a modification by removal of part of the system 202; a modification by addition or supplementation of additional features, resources, components or the like to the system 202; a modification by reorganizing all or part of the system 202; a modification by relocating all or part of the system 202; and other modifications as will be apparent to those skilled in the art. Such modifications affect the measurable characteristic 204 of the system and, where a modification results in an objective improvement in the measurable characteristic 204, the modification can be said to be an improvement to the system 202. All modifications are specified and/or indicated in a manner that is commonly available to the modification component and all miner 200 components such as a common language, specification scheme, modifier arrangement or other common grammar. For example, an extensible markup language specification, program code, script, descriptor or other specification or indication of a modification can be employed.

For example, a system 202 comprising multiple computers connected via a network in which communication between the computers is affected by a malicious attack by an outside agent, such as a distributed denial of service (DDOS) attack, can be measured in respect of a network latency such as a "ping" or similar metric as a measurable characteristic of the system 202. Notably, a system subject to a DDOS attack experiences resource consumption such as processor, memory or network consumption at the expense of other operations and a latency for communication with or within such a system will increase, resulting in, for example, a longer "ping" time. Thus, the characteristic of latency is measurable in such a system and can be improved by, for example, addressing the DDOS attack such as by mitigating, eliminating or protecting against the attack. Accordingly, a modification to such a system that effects a mitigation of the DDOS attack leads to an improvement in the measurable characteristic of latency and, accordingly, would constitute an improving modification.

As previously described, the condition to be satisfied by a miner 200 component for a new block to be added to the database 206 relates to the measurable characteristic 204 of the system 202. In particular, the condition requires that any candidate new block identifies a modification to the system (implementable by the modification component) that results in an improvement to the measure of the characteristic 204. Accordingly, each block 220 in the database 206 includes a specification or identification of a modification, such as provided using a common grammar, and a corresponding indication of a measure of the characteristic 204 for the system with the modification applied. In view of the condition that a new block identifies a modification to the system that results in an improvement to the measure of the characteristic 204, successive blocks in the database 206 will indicate successively improving measures of the characteristic 204. Notably, successive modifications can be cumulative such that a modification in a later block is to be applied to the system 202 after a modification in an earlier block. In some embodiments, alternative schemes for applying subsequent modifications can be employed, such as with reference to a baseline arrangement of the system 202 to which modifications are applied without cumulative effect.

Thus, in use, a miner component 200 includes an improver 214 component as a hardware, software, firmware or combination component configured to identify modifications to the system 202 that provide an improved measure of the characteristic 204. The improver 214 can operate in any suitable manner, the detail of which is beyond the scope of this specification, and can include, for example, machine learning features based on a specification or simulation of the system 202 to model modifications to the system 202 and measure the effect on characteristics 204. Thus, the improver 214 of the miner 200 is operable to generate an identification or specification of a modification 216. Notably, the modification 216 can originate from any miner in the miner network and can be processed by any other miner to test it for efficacy in improving the measurable characteristic 204.

The miner 200 includes a receiver component 208 for receiving a new modification 216 as a candidate modification for the system 202. The miner 200 further includes a measurer 210 component as a hardware, software, firmware or combination component for determining if the new modification 216 provides an improvement to a most recent measure of the characteristic 204 of the system 202 stored in a most recent (current) block of the database 206. In one embodiment, the measurer 210 operates on the basis of a simulation, emulation or other model of the system 202 to which the new modification 216 is applied to determine the effect of the new modification. Where the miner 200 determines, based on the measurer 210, that the new modification 216 provides or would provide an improvement to the characteristic 204 when applied to the system 202, a committer component 212 is operable to generate a new block for committing to the database 206. The new block includes an identification or specification of the modification (using a common grammar) and a measure of the characteristic 204 of the system 202 with the modification applied. Thus, when committed to the database, the new block is verifiable by all miners in the miner network on the basis of the identification or specification of the modification using the common grammar and with reference to the system 202.

Figure 3:
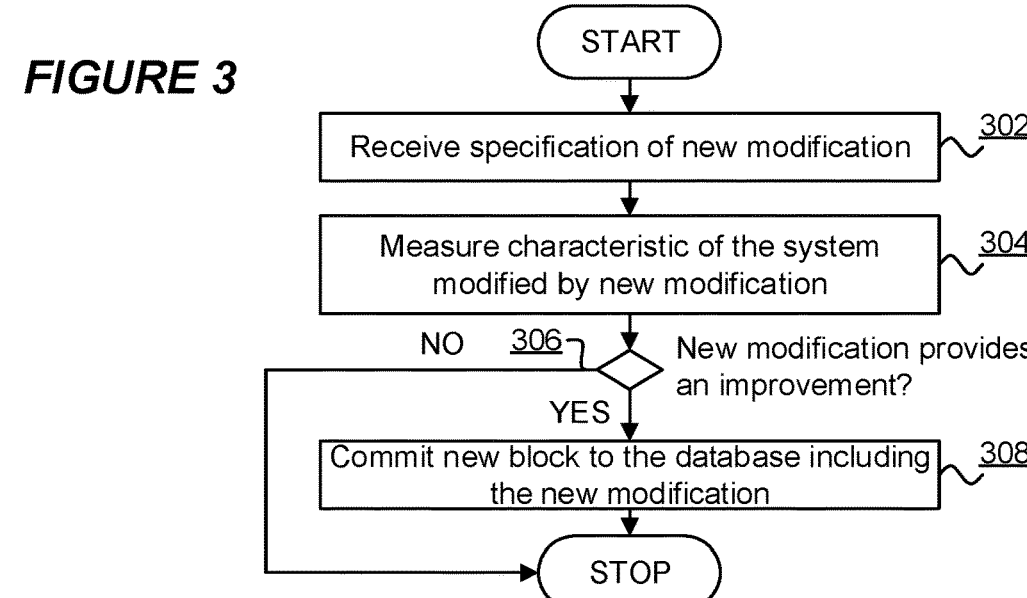
FIG. 3 is a flowchart of a method of consensus for a distributed transactional database in accordance with an embodiment of the present disclosure.

FIG. 3 is a flowchart of a method of consensus for a distributed transactional database in accordance with an embodiment of the present disclosure. Initially, at 302, the method receives an identification or specification of a new modification 216 for the system 202. At 304 the method measures the characteristic 204 of the system 202 having the new modification 216 applied. At 306 the method determines if the new modification 216 provides an improvement to the measure of the characteristic 204 and, if there is an improvement, a new block is committed to the database identifying or specifying the new modification 216.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of consensus for a distributed transactional database, the distributed transactional database comprising a logical chain of blocks of stored data, each block in the logical chain of blocks identifying a relationship to a preceding block in the logical chain of blocks by a hash of at least data stored in the block in the logical chain of blocks and data stored in the preceding block in the logical chain of blocks, such that a most recently added block in the logical chain of blocks is a current state of the distributed transactional database, and the distributed transactional database storing data relating to a system in execution that is at least a portion of a network of computer systems including one or more computers, the system having associated a measurable network performance characteristic capable of improvement, wherein a specification of a modification to the system and a measure of the network performance characteristic of the system corresponding to the modification to the system is stored in each block of the distributed transactional database such that the measure of the network performance characteristic improves in each successive block, the method comprising:

receiving a specification of a new modification to the system;

measuring the network performance characteristic for the system modified in accordance with the new modification;

responsive to a determination that the new modification provides an improvement to the measure of the network performance characteristic of the system in comparison with a measure stored in a most recent block, the determination made based on a simulation of the system to which the new modification is applied, committing a new block including the new modification to the distributed transactional database, thereby providing a way to determine consensus while also providing utility to the system, wherein the network performance characteristic is suitable for identifying a malicious attack of one or more computer systems in the network, and wherein the improvement to the measure of the network performance characteristic is indicative of a mitigation, a resolution, or a cessation of the malicious attack.

2. The method of claim 1, wherein modifications to the system are specified using a common grammar available to miner components operating with the distributed transactional database.

3. A computer system including a processor and a memory storing computer program code for performing the method of claim 1.

4. A non-transitory computer-readable storage medium comprising computer program code to, when loaded into a computer system and executed thereon, cause the computer system to perform the method of claim 1.

5. The method of claim 1, wherein the utility provided to the system is the improvement to the measure of the network performance characteristic of the system.

* * * * *